(12) United States Patent
Rohde et al.

(10) Patent No.: US 6,517,918 B1
(45) Date of Patent: Feb. 11, 2003

(54) MULTILAYER COMPOSITE PLASTICS MATERIAL CONTAINING A BARRIER LAYER OF POLYBUTYLENE TEREPHTHALATE

(75) Inventors: Wolfgang Rohde, Speyer (DE); Ulrich Büschges, Wachenheim (DE); Bernhard Springholz, Worms (DE)

(73) Assignee: Basell Polyolefine GmbH, Luwigshafen (DE)

( * ) Notice: Subject to any disclaimer, the term of this patent is extended or adjusted under 35 U.S.C. 154(b) by 0 days.

(21) Appl. No.: 09/226,145

(22) Filed: Jan. 7, 1999

(30) Foreign Application Priority Data

Jan. 28, 1998 (DE) .......................................... 198 03 134

(51) Int. Cl.[7] .......................... B32B 1/08; B32B 27/08; B32B 27/30; B32B 27/36
(52) U.S. Cl. ................... 428/35.7; 428/36.91; 428/483; 428/515; 428/516
(58) Field of Search ............................ 428/35.7, 35.91, 428/483, 515, 520, 516; 220/88.1

(56) References Cited

U.S. PATENT DOCUMENTS

| 4,397,916 A | | 8/1983 | Nagano ...................... 428/461 |
|---|---|---|---|
| 4,600,648 A | * | 7/1986 | Yazaki et al. ................ 428/412 |
| 4,612,221 A | * | 9/1986 | Biel et al. ................... 428/35.7 |
| 5,030,505 A | * | 7/1991 | Dickinson ................... 428/215 |
| 5,073,420 A | * | 12/1991 | Yano et al. ................. 428/35.7 |
| 5,120,586 A | * | 6/1992 | Nedzu et al. ............... 428/35.2 |
| 5,443,874 A | * | 8/1995 | Tachi et al. ................. 428/36.7 |
| 5,474,109 A | | 12/1995 | Stoeppelmann et al. .... 138/137 |
| 5,709,915 A | * | 1/1998 | Tomic et al. ............... 428/35.2 |

FOREIGN PATENT DOCUMENTS

| EP | 0 365 266 | 4/1990 |
|---|---|---|
| EP | 0 626 256 | 11/1994 |
| JP | 19940223586 | 9/1994 |
| WO | 95/09212 | 4/1995 |

OTHER PUBLICATIONS

Cowie, Polymers: Chemistry and Physics of Modern Materials, 2nd Edition, p. 345, 1991.*

* cited by examiner

Primary Examiner—Paul Thibodeau
Assistant Examiner—Ramsey Zacharia
(74) Attorney, Agent, or Firm—Keil & Weinkauf

(57) ABSTRACT

A multilayer composite plastics material, containing at least one layer (A), which consists, to an extent of least 90 wt %, based on the total weight of this layer, of ethylene homopolymers or copolymers, at least one barrier layer (B), which substantially consists of polybutylene terephthalate, and also, if desired, layers of adhesion promoter (C) serving to improve the adhesion between these layers.

7 Claims, No Drawings

MULTILAYER COMPOSITE PLASTICS MATERIAL CONTAINING A BARRIER LAYER OF POLYBUTYLENE TEREPHTHALATE

The present invention relates to a multilayer composite plastics material, containing at least one layer (A), which, based on the total weight of this layer, consists of at least 90 wt % of ethylene homopolymers or copolymers, at least one barrier layer (B), which substantially consists of polybutylene terephthalate and also, if desired, layers of adhesion promoter (C) serving to improve the adhesion between these layers.

The present invention also relates to a process for the preparation of such composite plastics materials, to hollow bodies and, in particular, plastic fuel cans made of such composite plastics materials and also to the use of polybutylene terephthalate as a barrier material in such multilayer composite plastics materials.

Polyethylene (PE), particularly high-density polyethylene (PE-HD), is highly suitable for extrusion blow molding of hollow bodies. Such hollow bodies are suitable for the storage and transport of liquid and solid materials. A special use of these hollow bodies is the storage and transport of hazardous liquid materials. Another usage is that of plastic fuel cans (PFC), such as are used in motorcars to provide a spare supply of liquid diesel fuel or fuel for Otto engines in a manner which saves space and weight. Its high degree of tenacity and rigidity and its good processibility, making it possible to produce even voluminous containers, are the reason for the widespread use of PE-HD as the material for said containers in said applications.

The main drawback of PE compared with conventional materials of which such containers are made, such as steel, is its high degree of permeability to non-polar liquids, such as hydrocarbons or halogenated hydrocarbons. In order to reduce hydrocarbon emissions from motorcars, PFCs of PE-HD are provided with an antipermeation barrier layer. This can be effected in a purely chemical way by treatment of the interior surface of the container with sulfur trioxide (sulfonization) or fluorine (fluorination) or by precipitation of the polymer in a plasma (plasma polymerization). Further known methods are the application of a layer of varnish or paint to the interior surface of the container or coextrusion of the polyethylene with a suitable barrier polymer.

Of these various processes, coextrusion has been increasingly adopted world wide. Suitable barrier polymers mainly used at present are polyamides (PA) or poly(ethylene-co-vinyl alcohol)s (EVOH) (cf W. Daubenbuechel, "Anwendung der Coextrusion beim Extrusionsblasformen", in Kunststoffe, 81, 894 (1991) and "Coextrudierte Kunststoffkraftstoffbehälter", ebenda, 82, 201 (1992)). Both types of material are suitable for use as barrier layers for the reduction of the permeation of non-polar stock material such as hydrocarbons, particularly diesel fuels and fuels for Otto engines not containing added alcohol. Polyamide has the advantage of being comparatively cheap, but it suffers from the drawback of showing an inadequate barrier effect to alcohol-containing, particularly methanol-containing, fuels when used in conjunction with PE as a composite. On the other hand, EVOH has a high barrier action to fuels containing or not containing alcohol, but the use of EVOH is less economical on account of the complicated process required for its manufacture.

It is an object of the present invention to provide a multilayer composite plastics material which no longer suffers from the above drawbacks and at the same time has a good barrier effect to fuels and is economical to produce.

Accordingly, we have found the above multilayer composite plastics materials, a process for the manufacture thereof, hollow bodies and plastic fuel cans made of such materials and the use of polybutylene terephthalate as a barrier material in such multilayer composite plastics materials.

The ethylene homopolymers or copolymers used for layer (A) are characterized by a melt flow rate MFR (190° C., 21.6 kg) of from 1 to 20 g/10 min, more preferably from 1 to 12 g/10 min and most preferably from 2 to 7 g/10 min. The density of these polymers is between 0.92 and 0.96 g/ccm, more preferably between 0.935 and 0.957 g/ccm and most preferably between 0.94 and 0.957 g/ccm. The polymers concerned are generally homopolymers of PE or poly(ethylene-co-$\alpha$-olefin)s. The total thickness of all of the PE layers is generally from 60 to 98.5% and preferably from 80 to 98% of the overall thickness of the composite. If the multilayer composite plastics material of the invention is in the particularly advantageous form of a 5-layer composite, which can be supplemented by a sixth reclaim layer if desired, the inside layer of PE usually has a thickness which is from 20 to 50%, preferably from 25 to 35%, of the overall thickness of the composite. The outer layer of PE usually has a thickness which is from 1 to 50%, preferably from 3 to 40%, of the overall thickness of the composite.

The multilayer composite plastics materials of the invention contain at least one barrier layer (B) substantially comprising polybutylene terephthalate. This polybutylene terephthalate preferably has a melt volume flow rate MVR (250° C./2, 16 kg) of from 3 to 60 mL/10 min, more preferably from 5 to 40 mL/10 min. Examples of suitable products have been found to be the various Ultradur® types (manufacturer: BASF AG).

The thickness of the barrier layer (B) is generally from 1 to 10% of the overall thickness of the composite material. Preferably it is from 1 to 5% and more preferably from 2 to 4%. The overall thickness of the composite, especially when used for containers, is usually between 1 and 20 mm, preferably between 1 and 10 mm and more preferably between 1.5 and 8 mm.

The composite plastics materials of the invention can exhibit various lamellar structures. Particularly advantageous is a 5-layer structure composed of a middle barrier layer (B) sandwiched between interior and exterior layers (A) with two layers of adhesion promoter (C) being located between the layers (A) and (B).

This 5-layer compound can be supplemented by a sixth reclaim layer in which the pinch-off material produced during the manufacture of the containers can be reused.

In such a 6-layer composite, the reclaim layer has a thickness which is from 10 to 60% of the overall thickness of the composite container material, preferably 15 to 50% and more preferably from 20 to 45%.

Furthermore, it is possible to make the inside and outside layers from polyethylene mixed with reclaim instead of pure PE. In such case the load-bearing inside and outside layers generally contain not more than 10%, preferably from 2 to 4%, of polybutylene terephthalate.

Multilayer compounds are conceivable, basically, in which a barrier layer (B) forms the inner or outer skin of a container.

In such cases the PE layer (A) and the barrier layer (B) are combined with an adhesion promoter layer (C) to form, preferably, a 3-layer compound. Particularly preferred are such 3-layer compound structures having an inner barrier layer (B) of polybutylene terephthalate.

In order to produce a permanent and stable bond between the layers (A) and (B), the presence of layers of adhesion promoter (C) between these layers (A) and (B) is advantageous. Preferably, these layers of adhesion promoter (C) substantially consist of polar-modified ethylene homopolymers or copolymers. By polar modification we mean here any introduction of polar groups into these polymers, achieved, for example, by copolymerization in the presence of polar comonomers, by graft polymerization with polar monomers or by a polymer-like reaction of polymers with polar modifying agents.

Suitable adhesion promoters are for example polar-modified polyethylenes based on low-density polyethylene (PE-LD), linear low-density polyethylene (PE-LLD) and PE-HD. Those layers of adhesion promoter (C) have been found to be advantageous which substantially consist of copolymers of ethylene and comonomers selected from the group comprising vinyl alcohol esters, acrylic acid and the esters thereof, methacrylic acid and the esters thereof, and the nitriles and amides of (meth)acrylic acid. Examples of particularly suitable comonomers are vinyl acetate, butyl acrylate and glycidyl methacrylate. Also suitable are copolymers of ethylene with vinyl alcohol esters (eg vinyl acetate), with acrylic acid or methacrylic acid, with (meth)acrylates (eg butyl acrylate, glycidyl methacrylate) or (meth) acrylonitrile, and also amides of (meth)acrylic acid. To these there may be added terpolymers of ethylene with two polar monomers as listed above, eg terpolymers of ethylene with an alkyl acrylate (eg butyl acrylate or methyl acrylate) and glycidyl methacrylate. Furthermore, PE-LLD and PE-HD can be used as the basis for suitable graft polymers with polar monomers. As the most important representatives of these graft polymer there may be mentioned various types of polyethylene grafted with ethylenically unsaturated carboxylic acids and their derivatives such as maleic anhydride. Instead of maleic anhydride, it is possible to use other monomers such as unsaturated carboxylic anhydrides, lactones, amides, lactams or imides. Finally, suitable adhesion promoters can also be obtained by the polymer-like reaction of polar-modified types of polyethylene with polyhydric alcohols, oxiranes (eg glycidyl alcohol) or polyvalent primary or secondary amines or amino alcohols. Examples of such adhesion promoters are described, for example, in the patent application WO 95/09212. All of the adhesion promoters mentioned here can be combined with each other to give optimum results. Finally, these adhesion promoters or blends of different adhesion promoters can be formulated with polyethylene and/or polybutylene terephthalate. The melt flow rate MFR (190° C./2, 16 kg) of the polar-modified types of polyethylene serving as adhesion promoters alone or in combination is generally between 0.05 and 20 g/10 min. We prefer to use such materials having melt flow rates MFR (190° C./2, 16 kg) of from 0.1 to 10 g/10 min, more preferably from 0.2 to 5 g/10 min.

Suitable commercially available adhesion promoters are Admer® L 2100 and Admer® GT 5E and Admer® GT 5-A (Mitsui Chemical), Lotader® A 8900, Lotader® 8920 and Orevac® 18501 and Orevac® 18334 (Elf Atochem), Fusabond® B 413 D (DuPont) and Igetabond® E and Igetabond® 2 C (Sumitomo).

The thickness of each layer of adhesion promoter is usually from 0.5 to 10% of the total thickness of the composite material. Preferably this thickness is from 1 to 5% and more preferably from 1 to 3% of the total thickness.

The preparation of the composite plastics materials of the invention is advantageously effected by a coextrusion process.

Suitable plants and processes for the manufacture of the containers of multilayer composite materials are for example the continuous or batch, preferably continuous, coextrusion blow-molding plants and processes known from PA or EVOH coextrusion (cf VDI. Gesellschaft Kunststofftechnik (Ed.), page 35, W. Vogi: "Sperrschichtbildung durch Coextrudieren" and page 59, J. Hagen: "Coextrusion aus der Sicht des Verarbeiters", VDI-Verlag GmbH, Dusseldorf 1986). If the pinch-off material occurring during manufacture is to be incorporated in the multilayer composite material in one or more separate layers, the milled pinch-off can be introduced directly, as ground material, or it can be granulated and then introduced in the form of granules. In both cases the processing stability of the pinch-off material can be raised by the addition of suitable stabilizers (eg phenolic and phosphitic antioxidants). Also, to improve the compatibility of the polybutylene terephthalate present in the milled material with the PE polymer matrix, additional adhesion promoter or compatibility promoter may be incorporated in the reclaim layer. The thickness of the reclaim layer is generally from 0 to 60%, preferably from 0 to 45%, of the overall thickness of the container wall.

Particularly advantageous is the use of the multilayer composite plastics material of the invention for the preparation of hollow bodies such as bottles, cans, containers, fuel oil tanks or pipes, particularly plastic fuel cans.

The following example illustrates the special advantages of the use of polybutylene terephthalate as barrier material in multilayer composite plastics materials and the efficiency thereof in achieving a reduction of permeability.

EXAMPLE

In a coextrusion blow-molding plant KEB 8 sold by Krupp-Kautex Maschinenbau GmbH there were manufactured 6-layer bottles having a nominal capacity of 1 L. The lamellar structure of these bottles was as follows:

inside layer of PE (LUPOLEN 4261 AG) (A)

inner adhesion promoter (C)

barrier layer (B)

outer adhesion promoter (C)

reclaim layer (in this case LUPOLEN 4261 AG) (A)

outside layer of PE (LUPOLEN 4261 AG) (A)

The blowing pressure was 8 bar. The polyethylene was extruded at a mass temperature of 220° to 240° C. The thicknesses of the barrier layers were in each case determined using optomicroscopic photographs.

For assessment of permeation, the bottles were filled up to 50% of their nominal capacity with test solution as specified in DIN 51,604 FAM-B (containing 15% methanol). The bottles were hermetically sealed with a screw-threaded cap of brass and a Viton gasket. These bottles (three of each type) were then stored in a temperature-controlled chamber at an ambient temperature of 40° C. over a period of 91 days. The values given in Table 1 are the average permeation values following this storage time. In the last columns of Table 1 the permeation values are based on the surface area (0.062 m$^2$) of the bottle and on the thickness of the barrier layer, in order atomake accurate comparisons possible. In experiment Ex. 1 illustrating the invention, the polybutylene terephthalate Ultradu® B 4500 (manufactured by BASF AG) was used.

The results are shown in Table 1:

TABLE 1

| Experiment | Barrier layer (B) | Adhesion promoter layers (C) | Total thickness of container [ηm] | Thickness of barrier layer d [ηm] | Permeation Fuel FAM-B [g] | Permeation Fuel FAM-B [g 100 ηm/m² ηmd] |
|---|---|---|---|---|---|---|
| Ex. 1 | Ultradur ® B 4500 | Lotader ® AX 8840 | 2267 | 87 | 307 | 5.15 |
| Comp. Ex. 1 | Ultramid ® C4 FN | Orevac ® 18334 | 2220 | 157.6 | 930 | 45.15 |

Comparison of the two experiments, calibrated to equal barrier layer thicknesses, shows that the barrier layer of polybutylene terephthalate reduces the permeation to almost ten times less than that achieved using the barrier layer of polyamide.

We claim:

1. A multilayer composite plastics material, containing at least one layer (A), which consists, of ethylene homopolymer or copolymer, at least one barrier layer (B) which consists of polybutylene terephthalate, and layers of adhesion promoter (C) which comprises a material resulting from the polymerization of polar-modified polyethylene with polyhydric alcohols, polyvalent primary or secondary amines, or polyhydric amino alcohols and which is serving to improve the adhesion between these layers.

2. The multilayer composite plastic material of claim 1, wherein this material is made up of five layers comprising a centrally disposed barrier layer (B), one inner and one outer skin layer (A), and also two layers of adhesion promoter (C) situated between the layers (A) and (B).

3. The multilayer composite plastic material of claim 2 which is supplemented by a sixth reclaim layer.

4. The multilayer composite plastics material of claim 1, wherein the ethylene homopolymer or copolymer in the layers (A) has a density of from 0.92 to 0.96 g/cm³.

5. The multilayer composite plastic material of claim 1, wherein the barrier layer (B) contains a polybutylene terephthalate having a melt flow rate MVR (250° C./2, 16 kg) of from 3 to 60 mL/10 min.

6. A hollow body comprising the multilayer composite plastics material of claim 1.

7. A plastic fuel can comprising the multilayer composite plastics material of claim 1.

* * * * *